United States Patent [19]
Curry et al.

[11] Patent Number: 5,949,880
[45] Date of Patent: Sep. 7, 1999

[54] TRANSFER OF VALUABLE INFORMATION BETWEEN A SECURE MODULE AND ANOTHER MODULE

[75] Inventors: Stephen M. Curry, Dallas; Donald W. Loomis, Coppell; Michael L. Bolan, Dallas, all of Tex.

[73] Assignee: Dallas Semiconductor Corporation, Dallas, Tex.

[21] Appl. No.: 08/978,798

[22] Filed: Nov. 26, 1997

Related U.S. Application Data

[62] Division of application No. 08/594,975, Jan. 31, 1996.

[51] Int. Cl.[6] .......................................... H04L 9/00

[52] U.S. Cl. ................................ 380/24; 380/25; 705/39; 705/42

[58] Field of Search .................................. 380/23, 24, 25; 705/39, 40, 42

[56] References Cited

U.S. PATENT DOCUMENTS

| | | | |
|---|---|---|---|
| 5,003,594 | 3/1991 | Shinagawa | 380/24 |
| 5,539,825 | 7/1996 | Akiyama et al. | 380/24 |
| 5,546,463 | 8/1996 | Caputo et al. | 380/25 |
| 5,577,121 | 11/1996 | Davis et al. | 380/24 |
| 5,621,796 | 4/1997 | Davis et al. | 380/24 |
| 5,642,419 | 6/1997 | Rosen | 380/23 |
| 5,671,280 | 9/1997 | Rosen | 380/24 |

*Primary Examiner*—Thomas H. Tarcza
*Assistant Examiner*—Carmen D. White
*Attorney, Agent, or Firm*—Jenkens & Gilchrist

[57] ABSTRACT

The present invention relates to system, apparatus and method for communicating valuable data from a portable module to another module via an electronic device. More specifically, the disclosed system, apparatus and method are useful for enabling a user to fill a portable module with a cash equivalent and to spend the cash equivalent at a variety of locations. The disclosed system incorporates an encryption/decryption method.

6 Claims, 8 Drawing Sheets

TRANSFER OF VALUABLE INFORMATION BETWEEN A SECURE MODULE AND ANOTHER MODULE

This application is a Divisional of application Ser. No. 08/594,975 filed on Jan. 31, 1996.

CROSS REFERENCE TO OTHER APPLICATIONS

The following applications of common assignee contains related subject matter and is hereby incorporated by reference:

Ser. No. UNKNOWN, filed Jan. 31, 1996, entitled METHOD, APPARATUS, SYSTEM AND FIRMWARE FOR SECURE TRANSACTIONS; and Ser. No. UNKNOWN, filed Jan. 31, 1996, entitled METHOD, APPARATUS AND SYSTEM FOR TRANSFERRING UNITS OF VALUE.

BACKGROUND OF THE INVENTION

1. Technical Field of the Invention

The present invention relates to a method and system for transferring valuable information securely between a secure module and another module. More particularly, the present invention relates to transferring units of value between a microprocessor based secure module and another module used for carrying a monetary equivalent.

2. Description of Related Art

In the past the preferred means for paying for an item was cash. As our society has become more advanced, credit cards have become an accepted way to pay for merchandise or services. The payment is not a payment to the merchant, but instead is a credit given by a bank to the user that the merchant accepts as payment. The merchant collects money from the bank based on the credit. As time goes on, cash is used less and less, and money transfers between parties are becoming purely electronic.

Present credit cards have magnetic strips to identify the owner of the card and the credit provider. Some credit cards have electronic circuitry installed that identifies the credit card owner and the credit or service provider (the bank).

The magnetic strips installed in present credit cards do not enable the card to be used as cash. That is the modern credit card does not allow the consumer to buy something with the credit card and the merchant to receive cash at the time of the transaction. Instead, when the consumer buys something on credit, the merchant must later request that the bank pay for the item that the consumer bought. The bank then bills the consumer for the item that was bought.

Thus, there is a need for an electronic system that allows a consumer to fill an electronic module with a cash equivalent in the same way a consumer fills his wallet with cash. When the consumer buys a product or service from a merchant, the consumer's module can be debited and the merchant's cash drawer can be credited without any further transactions with a bank or service provider.

SUMMARY OF THE INVENTION

The present invention is an apparatus, system and method for communicating a cash equivalent electronically to and from a portable module. The portable module can be used as a cash equivalent when buying products and services in the market place.

The present invention comprises a portable module that can communicate to a secure module via a microprocessor based device. The portable module can be carried by a consumer, filled with electronic money at an add-money station, and be debited by a merchant when a product or service is purchased by the consumer. As a result of a purchase, the merchant's cash drawer will indicate an increase in cash value.

BRIEF DESCRIPTION OF THE DRAWINGS

A more complete understanding of the method and apparatus of the present invention may be had by reference to the following Detailed Description when taken in conjunction with the accompanying Drawings wherein.

DETAILED DESCRIPTION OF A PRESENTLY PREFERRED EXEMPLARY EMBODIMENT

Figure 1:
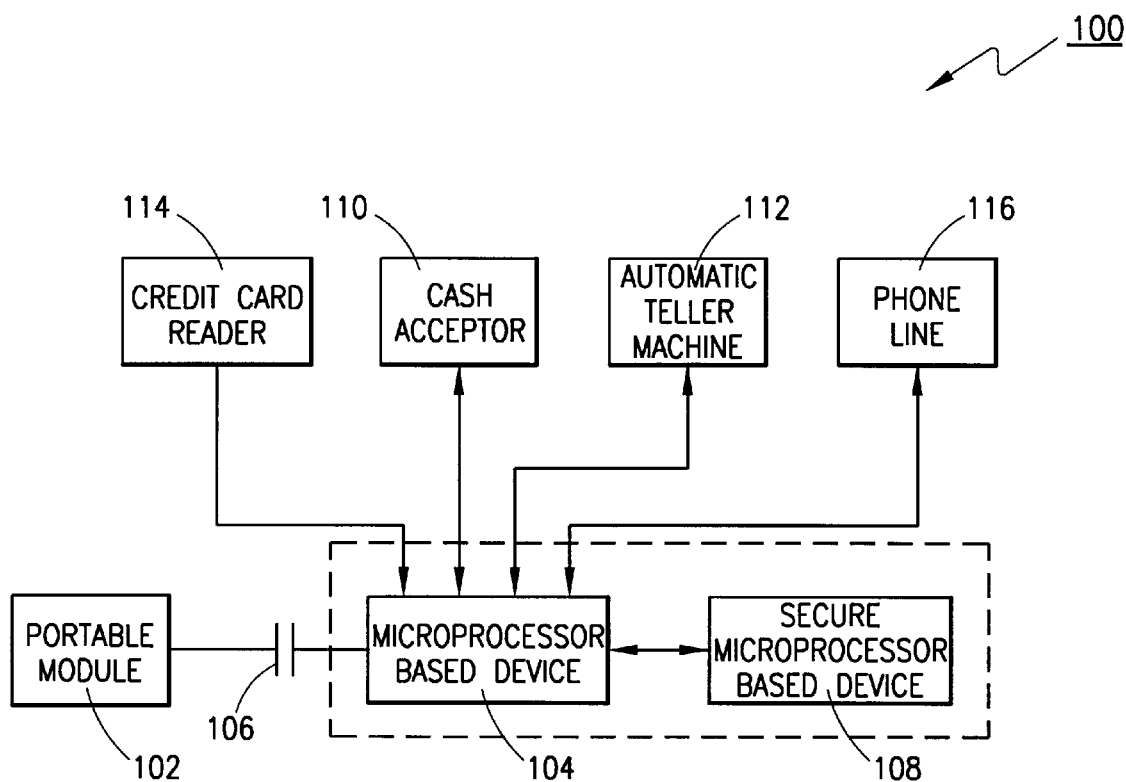
FIG. 1 depicts an exemplary system for transferring valuable information between a module and a secure device.

FIG. 1 depicts a block diagram of an exemplary system 100 for transferring valuable information to and from a portable module. A portable module 102, which will be described in more detail later, communicates to a microprocessor based device 104. The portable module 102 may contain information that represents units of exchange or a currency equivalent. The microprocessor based device 104 can be any of an unlimited number of devices. For example, the microprocessor based device 104 could be a personal computer, an add-a-fare machine at a train or bus station (similar to those in today's District of Columbia metro stations), a turn style, a toll booth, a bank's terminal, a ride at a carnival, a washing machine at a Laundromat, a locking device, a mail metering device or any device that controls access, or meters a monetary equivalent, etc.

The means for communication 106 between the portable module 102 and the microprocessor based device 104 is preferably via a single wire or contact connection. The single wire connection 106 preferably incorporates a communication protocol that allows the portable module 102 and the microprocessor based device 104 to communicate in a bidirectional manner. Preferably the communication protocol is a one-wire protocol developed by Dallas Semiconductor. It is understood that the means for communicating 106 is not limited to a single wire connection. The communication means 106 could be multiple wires, a wireless communication system, infrared light, any electromagnetic means, a magnetic technique, or any other similar technique.

The microprocessor based device 104 is electrically connected to another microprocessor based device, which is preferably a secure device 108. The term secure device means that the device is designed to contain a secret code and the secret code is extremely difficult to learn. An example of a secure device 108 is explained later in this document.

The microprocessor based device 104 can be connected to a variety of other devices. Such devices include, but are not limited to a cash acceptor 110, an automatic teller machine (ATM) 112, a credit card reader 114, and a phone line 116.

The cash acceptor 110 is adapted to receive cash in the form of currency, such as dollar bills or coins. The cash acceptor 110, preferably, determines the value of the accepted currency. The cash acceptor 110 communicates to the microprocessor based device 104 and informs the device 104 of how much currency has been deposited in the cash acceptor 110.

The cash acceptor 110 can also be a device which provides currency. That is, the cash accepter 110 in response to a communication from the microprocessor based device 104, may provide a metered amount of currency to a person.

The credit card reader 114, and ATM 112 can also be attached to the microprocessor based device 104. The credit card reader 114 could be used to read a user's credit card and then, when authorized, either communicate to the microprocessor based device 104 that units of exchange need to be added to the portable module or that units of exchange need to be extracted from the portable module to pay for a good, service or credit card bill.

The ATM 112 may also be connected to the microprocessor based device. Via communications from the ATM 112, the microprocessor based device 104 can be informed that units of exchange need to be added or subtracted from the portable module 102.

Furthermore, it is also possible that the microprocessor based device 104 is connected to a phone line 116. The phone line may be used for a variety of things. Most importantly, the phone line may be used to allow the microprocessor based device 104 to communicate with a network of devices. Such telephonic communication may be for validating transactions or for aiding the accounting of transactions that are performed via the microprocessor based device's 104 aid. It is further understood that the phone line may be any of a vast variety of communication lines including wireless lines. Video, analog, or digital information may be communicated over the phone line 116.

Figure 2:
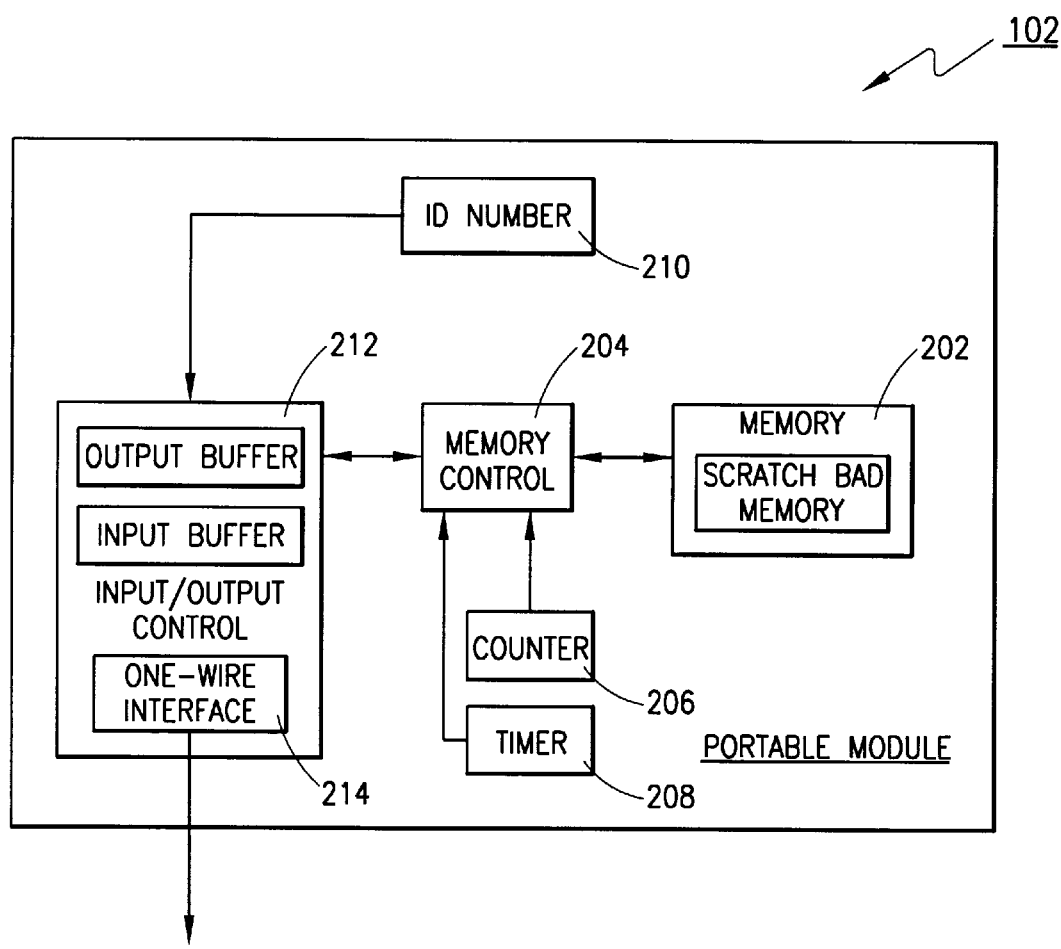
FIG. 2 is a block diagram of an embodiment of a portable module.

FIG. 2 depicts a preferred exemplary portable module 102. The portable module 102 is preferably a rugged read/write data carrier that can act as a localized data base and be easily accessed with minimal hardware. The module can be incorporated in a vast variety of portable items which includes, but is not limited to a durable micro-can package that is highly resistant to environmental hazards such as dirt, moisture, and shock. The module can be incorporated into any object that can be articulated by a human or thing, such as a ring, bracelet, wallet, name tag, necklace, baggage, machine, robotic device, etc. Furthermore, the module 102 could be attached to a stationary item and the microprocessor based device 104 may be articulated to the portable module 102. For example, the module 102 may be attached to a piece of cargo and a module reader may be touched to or brought near the module 102. The module reader may be part of the microprocessor based device 104.

The portable module 102 comprises a memory 202 that is preferably, at least in part, nonvolatile memory for storing and retrieving vital information pertaining to the system to which the module 102 may become attached to. The memory 202 may contain a scratchpad memory which may act as a buffer when writing into memory. Data is first written to the scratchpad where it can be read back. After data has been verified, the data is transferred into the memory.

The module 102 also comprises a counter 206 for keeping track of the number of transactions the module has performed (the number of times certain data in the memory of the module has been changed). A timer 102 may be provided in the module to provide the ability to time stamp transactions performed by the module. A memory controller 204 controls the reading and writing of data into and out of the memory 202.

The module also may comprise an identification number 210. The identification number preferably uniquely identifies the portable module from any other portable module.

An input/output control circuit 212 controls the data flow into and out of the portable module 102. The input/output control ("I/O") 212 preferably has an input buffer and an output buffer and interface circuitry 214. As stated above, the interface circuitry 214 is preferably a one-wire interface. Again, it is understood that a variety of technologies can be used to interface the portable module 102 to another electronic device. A single wire or single connection is preferred because the mechanics of making a complete connection is simplified. It is envisioned that a proximity/wireless communication technique is also a technique for communicating between the module 102 and another device. Thus, the interface circuit 214 can be a single wire, multiple wire, wireless, electromagnetic, magnetic, light, or proximity, interface circuit.

Figure 3:
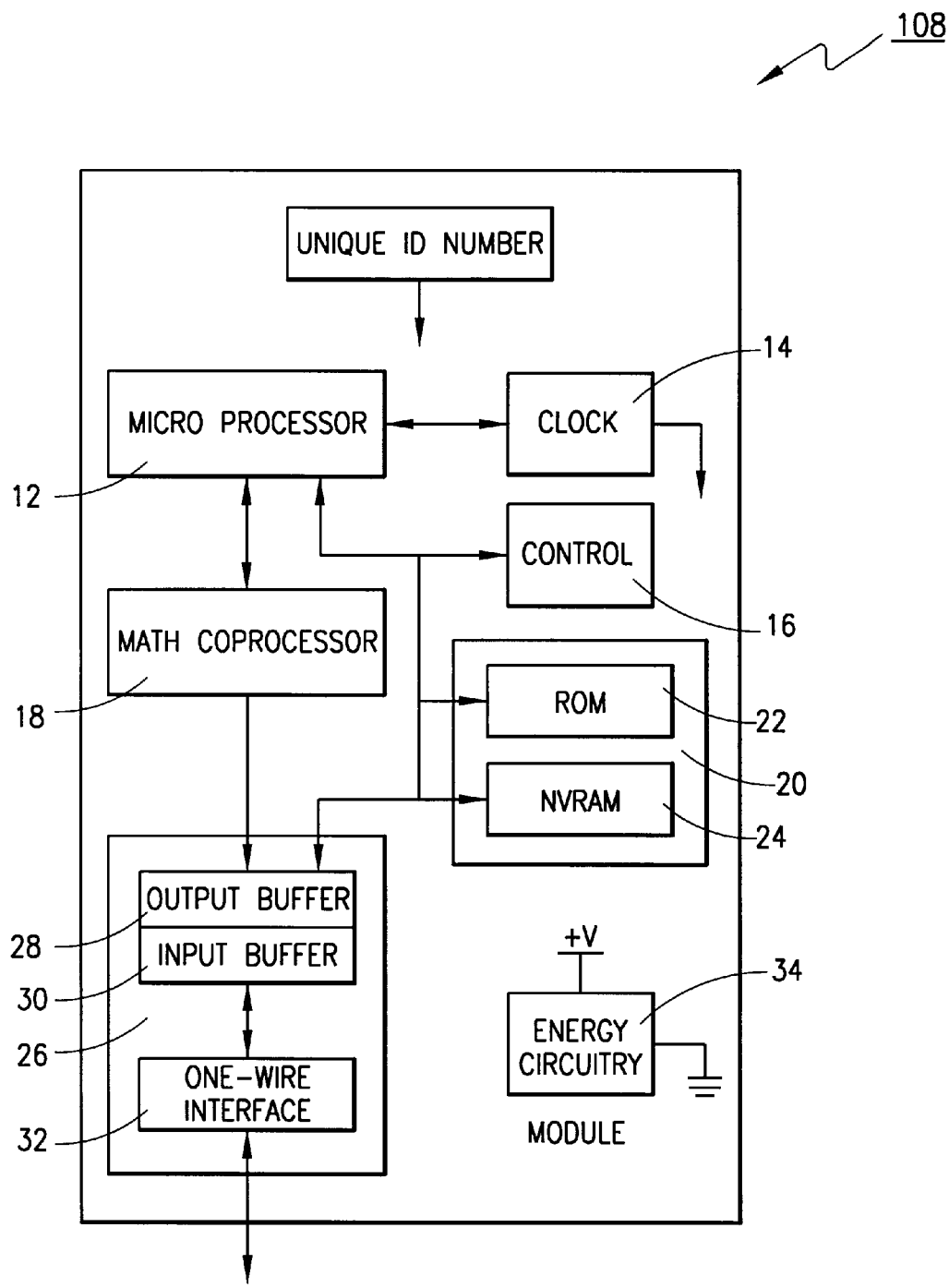
FIG. 3 is a block diagram of an embodiment of a microprocessor based module.

FIG. 3 depicts a block diagram of an exemplary secure microprocessor based device ("secure device") 108. The secure device circuitry can be a single integrated circuit. It is understood that the secure device 108 could also be a monolithic or multiple circuits combined together. The secure device 108 preferably comprises a microprocessor 12, a real time clock 14, control circuitry 16, a math coprocessor 18, memory circuitry 20, input/output circuitry 26, and an energy circuit 34.

The secure device 108 could be made small enough to be incorporated into a variety of objects including, but not limited to a token, a card, a ring, a computer, a wallet, a key fob, a badge, jewelry, a stamp, or practically any object that can be grasped and/or articulated by a user of the object. In the present system 100, the secure device 108 is preferably adapted to be a trusted certifying authority. That is the secure device 108 is a trusted computer. The secure device 108 comprises a numeric coprocessor 18 optimized for math intensive encryption. The BIOS is immune to alteration and is specifically designed for secure transactions. This secure device 108 is preferably encased in a durable, dirt, moisture and shock resistant stainless steel enclosure, but could be encased in wide variety of structures so long as specific contents of the secure device 108 are extremely difficult to decipher. The secure device 108. The secure device 108 may have the ability to store or create a private/public key set, whereby the private key never leaves the secure device 108 and is not revealed under almost any circumstance. Furthermore, the secure module 108 is preferably designed to prevent discovery of the private key by an active self-destruction of the key upon wrongful entry.

The microprocessor 12 is preferably an 8-bit microprocessor, but could be 16, 32, 64 or any operable number of bits. The clock 14 provides timing for the module circuitry. There can also be separate clock circuitry 14 that provides a continuously running real time clock.

The math coprocessor circuitry 18 is designed and used to handle very large numbers. In particular, the coprocessor will handle the complex mathematics of RSA encryption and decryption or other types of math intensive encryption or decryption techniques.

The memory circuitry 20 may contain both read-only-memory and non-volatile random-access-memory.

Furthermore, one of ordinary skill in the art would understand that volatile memory, EPROM, SRAM and a variety of other types of memory circuitry might be used to create an equivalent device.

Control circuitry 16 provides timing, latching and various necessary control functions for the entire circuit.

An input/output circuit 26 enables bidirectional communication with the secure module 108. The input/output circuitry 26 preferably comprises at least an output buffer and an input buffer. For communication via a one-wire bus, one-wire interface circuitry can be included with the input/output circuitry 26. It is understood that the input/output circuitry 26 of the secure device 108 can be designed to operate on a single wire, a plurality of wires or any means for communicating is information between the secure module 108 and the microprocessor based device 104.

An energy circuit 34 may be necessary to maintain stored information in the memory circuitry 20 and/or aid in powering the other circuitry in the module 108. The energy circuit 34 could consist of a battery, capacitor, R/C circuit, photo-voltaic cell, or any other equivalent energy producing circuit or means.

The firmware architecture of the secure module 108 and how it operates within the exemplary system for transferring valuable information, such as units of exchange or currency, between the secure module 108 and a portable module 102 will now be discussed. The secure module 108 provides encryption and decryption services for confidential data transfer through the microprocessor based device 104. The following examples are intended to illustrate a preferred feature set of the secure module 108 and to explain the services that the exemplary system 100 can offer. These applications and examples by no means limit the capabilities of the invention, but instead bring to light a sampling of its capabilities.

I. Overview of the Preferred Secure Module 108 and its Firmware Design

Referring to FIG. 3 again, the secure module 108 preferably contains a general-purpose, 8051-compatible micro controller 12 or a reasonably similar product, a continuously running real-time clock 14, a high-speed modular exponentiation accelerator for large integers (math coprocessor) 18, input and output buffers 28, 30 with a one-wire interface 32 for sending and receiving data, 32 Kbytes of ROM memory 22 with preprogrammed firmware, 8 Kbytes of NVRAM (non-volatile RAM) 24 for storage of critical data, and control circuitry 16 that enables the micro controller 12 to be powered up to interpret and act on the data placed in an input data object. The module 108 draws its operating power from a single wire, one-wire communication line. The micro controller 12, clock 14, memory 20, buffers 28, 30, one-wire front-end 32, modular exponentiation accelerator 18, and control circuitry 16 are preferably integrated on a single silicon chip and packaged in a stainless steel micro can using packaging techniques which make it virtually impossible to probe the data in the NVRAM 24 without destroying the data. Initially, most of the NVRAM 24 is available for use to support applications such as those described below. One of ordinary skill will understand that there are many comparable variations of the module design. For example, volatile memory might be used, or an interface other than a one-wire interface could be used.

The secure module 108 is preferably intended to be used first by a Service Provider who loads the secure module 108 with data to enable it to perform useful functions, and second by an End User who issues commands to the secure module 108 to perform operations on behalf of the Service Provider for the benefit of the End User. For this reason, the secure module 108 offers functions to support the Service Provider in setting up the module for an intended application. It also offers functions to allow the End User to invoke the services offered by the Service Provider.

Figure 6:
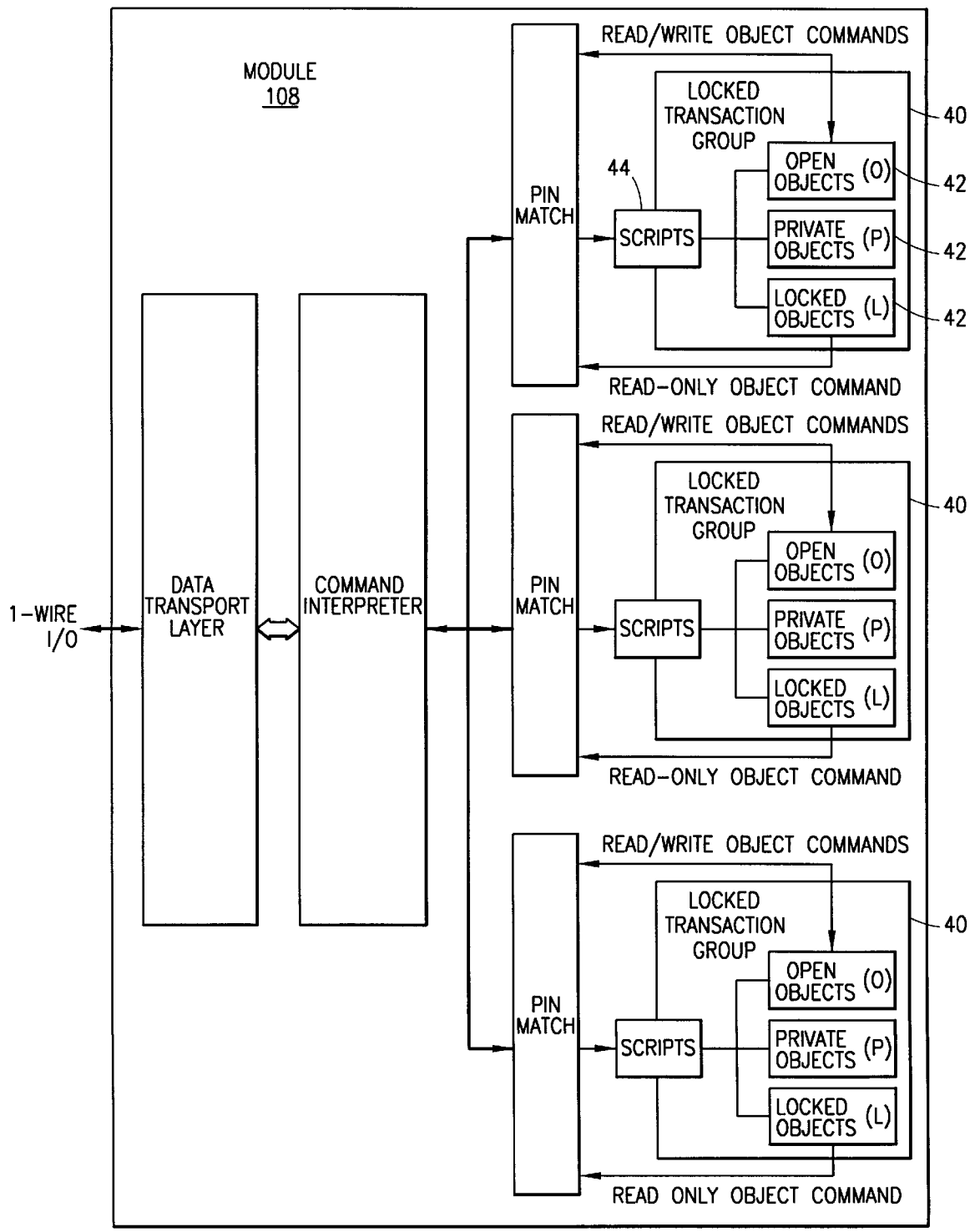
FIG. 6 is an exemplary organization of the software and firmware within a secure microprocessor based device.
Figure 7:
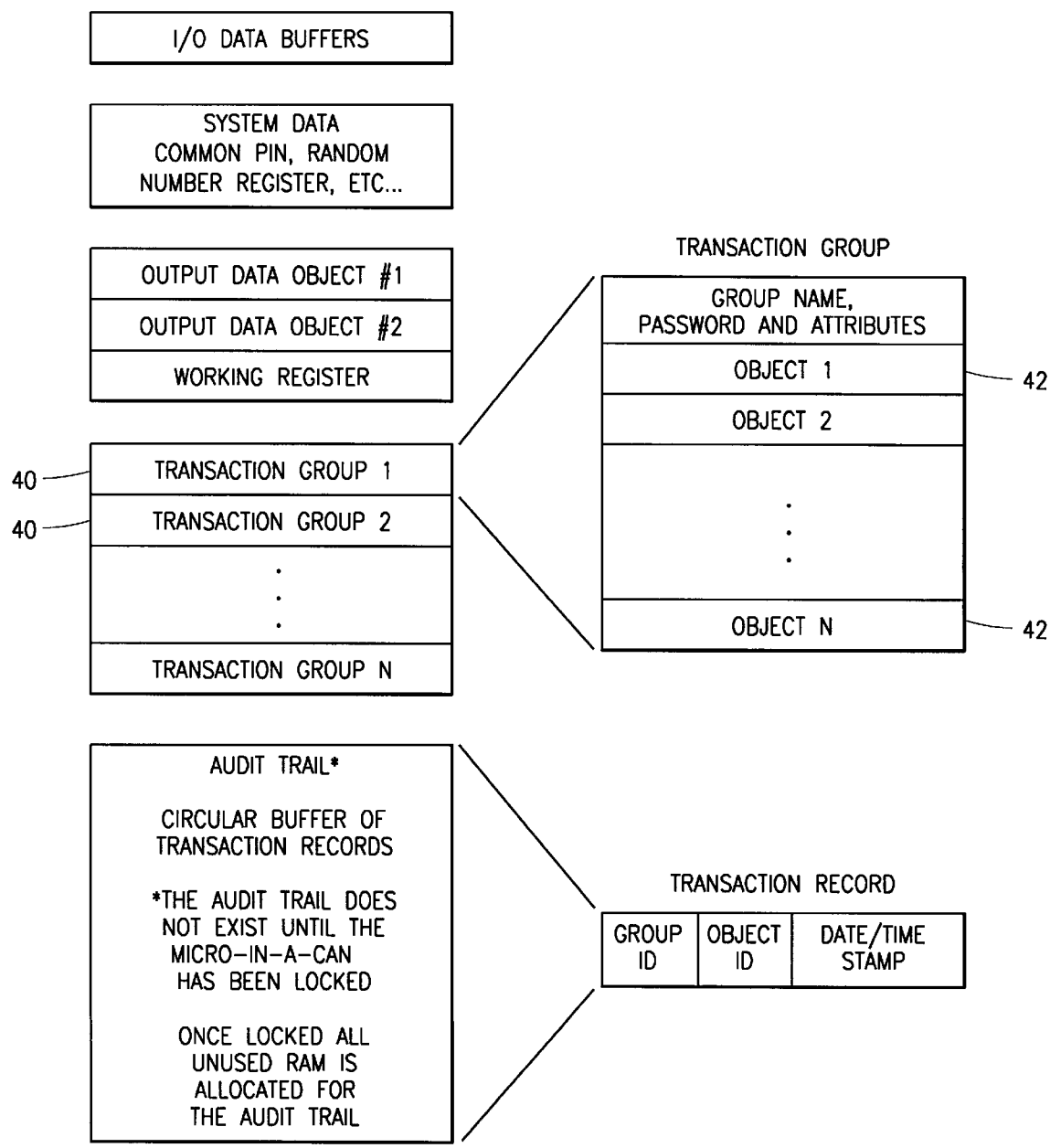
FIG. 7 is an exemplary configuration of software and firmware within a secure microprocessor based device.

Each Service Provider can reserve a block of NVRAM memory to support its services by creating a transaction group 40 (refer to FIGS. 6 and 7). A transaction group 40 is simply a set of software objects 42 that are defined by the Service Provider. These objects 42 include both data objects (encryption keys, transaction counts, money amounts, date/time stamps, etc.) and transaction scripts 44 which specify how to combine the data objects in useful ways. Each Service Provider creates his own transaction group 40, which is independent of every other transaction group 40. Hence, multiple Service Providers can offer different services in the same module 108. The number of independent Service Providers that can be supported depends on the number and complexity of the objects 42 defined in each transaction group 40. Examples of some of the objects 42 that can be defined within a transaction group 40 are the following:

| | |
|---|---|
| RSA Modulus | Clock Offset |
| RSA Exponent | Random SALT |
| Transaction Script | Configuration Data |
| Transaction Counter | Input Data |
| Money Register | Output Data |
| Destructor | |

Within each transaction group 40 the secure module 108 will initially accept certain commands which have an irreversible effect. Once any of these irreversible commands are executed in a transaction group 40, they remain in effect until the end of the module's useful life or until the transaction group 40, to which it applies, is deleted from the secure module 108. In addition, there are certain commands which have an irreversible effect until the end of the module's life or until a master erase command is issued to erase the entire contents of the secure module 108. These commands will be discussed further below. These commands are essential to give the Service Provider the necessary control over the operations that can be performed by the End User. Examples of some of the irreversible commands are:

| | |
|---|---|
| Privatize Object | Lock Object |
| Lock Transaction Group | Lock Micro-In-A-Can ™ |

Since much of the module's utility centers on its ability to keep a secret, the Privatize command is a very important irreversible command.

Once the secure module 108, as a whole, is locked, the remaining NVRAM memory 24 is allocated for a circular buffer for holding an audit trail of previous transactions. Each of the transactions are identified by the number of the transaction group, the number of objects 42 within the specified group, and the date/time stamp.

The fundamental concept implemented by the firmware is that the Service Provider can store transaction scripts 44 in a transaction group 40 to perform only those operations among objects that he wishes the End User to be able to perform. The Service Provider can also store and privatize RSA key or keys (encryption keys) that allow the secure module 108 to "sign" transactions on behalf of the Service Provider, thereby guaranteeing their authenticity. By privatizing and/or locking one or more objects 42 in the transaction group 40, the Service Provider maintains control over what the secure module 108 is allowed to do on his behalf. The End User cannot add new transaction scripts 44 and is therefore limited to the operations on objects 42 that can be performed with the transaction scripts 44 programmed by the Service Provider.

II. Usage Models of the Secure Module 108 and Portable Module 102

This section presents practical applications of the system 100. Each of these applications is described in enough detail to make it clear why the secure module 108 and portable module 102 are important to the system application.

A. Transferring Units of Exchange Out of a Portable Module 102

This section describes an example of how a portable module 102 and a secure module 108 operate in conjunction with the microprocessor based device 104 so that units of exchange can be securely transferred out of the portable module 102 and deposited into the secure module 108 and/or potentially communicated to at least one of the cash acceptor 110, ATM 112, credit card reader 114, or the phone line 116.

Figure 4:
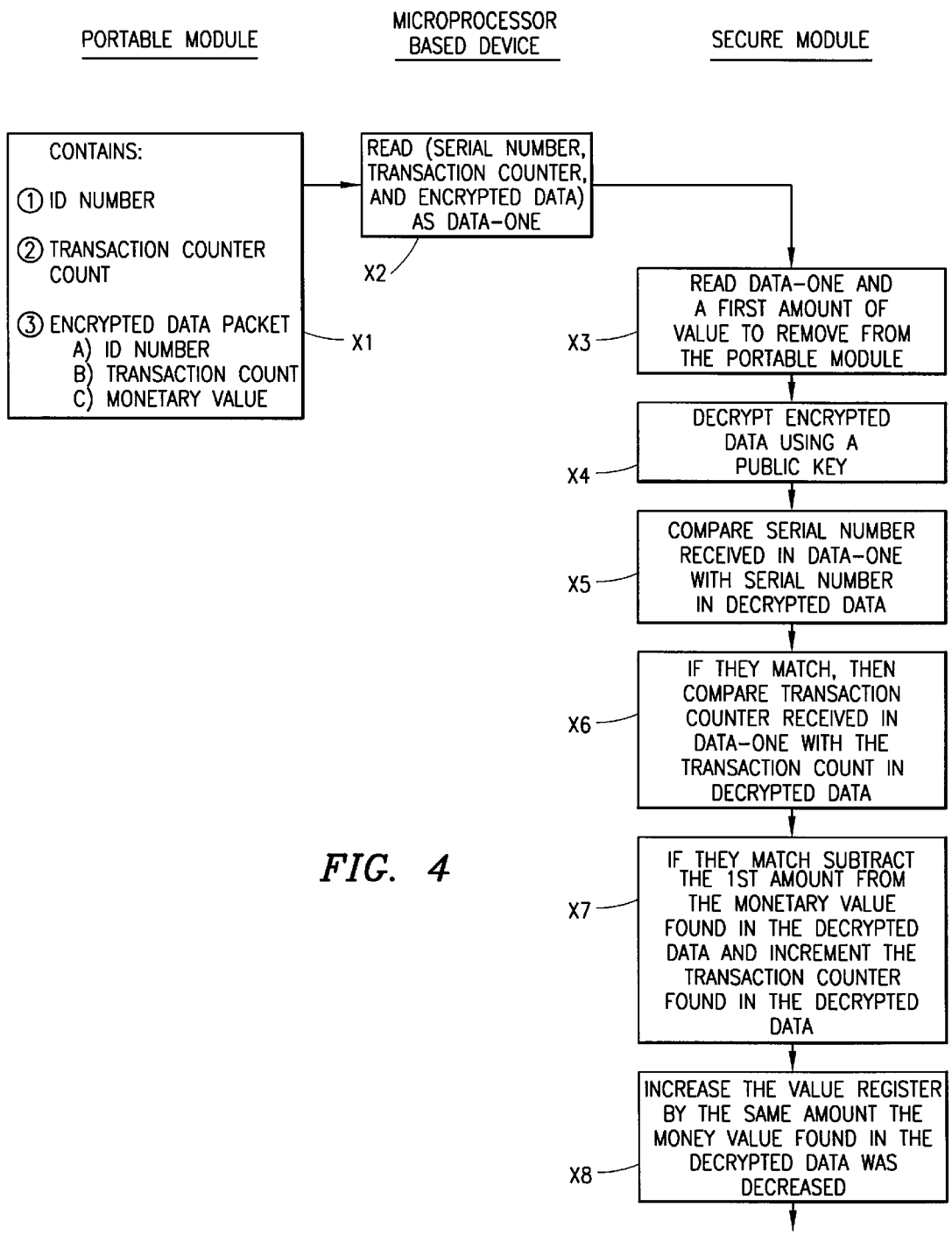
FIG. 4 is an exemplary technique for transferring valuable data securely into a portable module.
Figure 4:
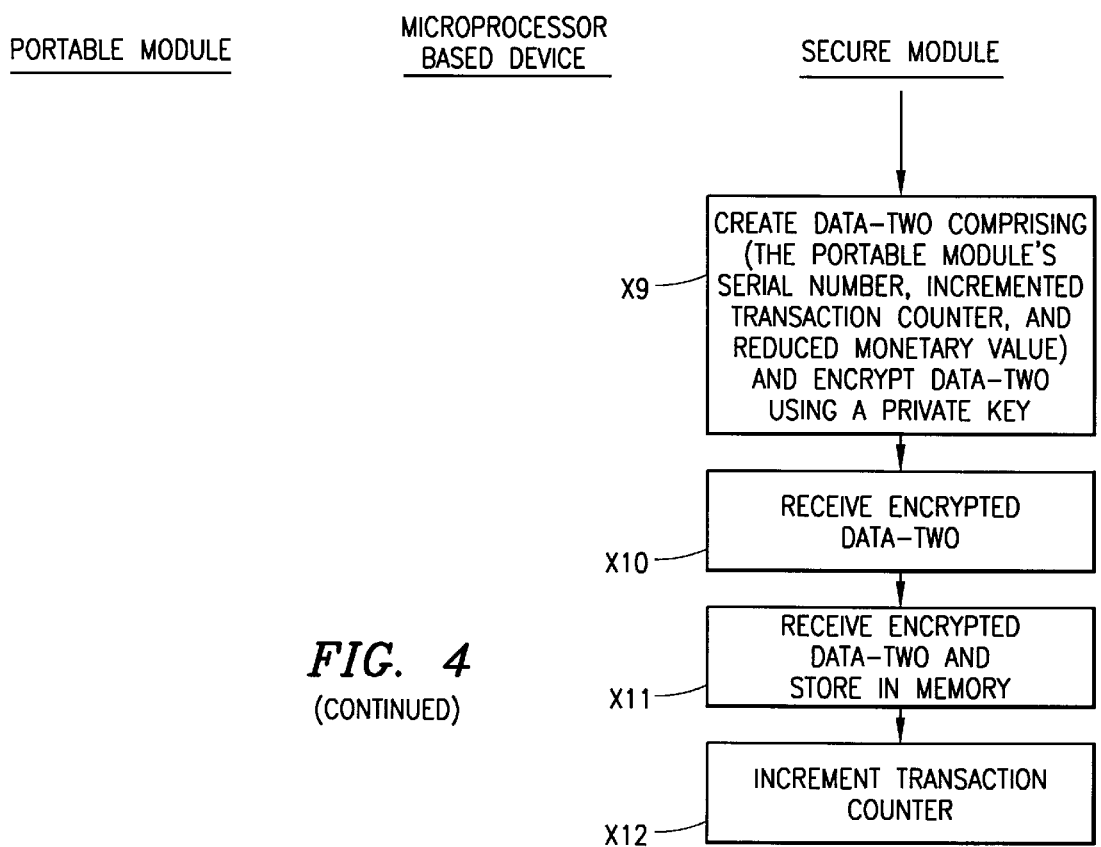

Referring to FIG. 4, initially the portable module 102 contains its ID number, a count within its transaction counter and an encrypted data packet stored in memory. Encrypted within the data packet is the portable modules ID number, the portable modules transaction count number, and the amount of value (the monetary value) of the portable module at the present time X1.

The user of the portable module touches, or somehow puts the portable module 102 into communication with the microprocessor based device 104. For explanation purposes, suppose the portable module 102 is being used as a token used to pay for a train fare. Thus, the microprocessor based device 104 could be, in this case, a turn style that allows the user to enter a train platform. The cost of entering the train platform is known by the microprocessor based device 104.

The microprocessor based device 104 reads the portable module's serial number, transaction count, and the encrypted data packet X2. This data could be referred to as a first data.

The microprocessor device 104 then provides the first data along with a first value, being the amount of value to be debited from the portable token (the train fare), to the secure module 108 X3. The secure module 108 decrypts the encrypted data found in the first data using a public key X4.

Next, the secure module 108 makes a few comparisons to make sure that the data received is good data and not counterfeit. The secure module 108 compares the serial number received in the first data with the decrypted serial number X5. If the two serial numbers match then the secure module 108 compares the transaction count received in the first data with the decrypted transaction count X6. If the two transaction counts match then the secure module is comfortable that the data received is not counterfeit data. It is understood that the comparisons can be done in any order.

Furthermore, there may have been a time stamp sent from the portable module 102. The time stamp may indicate a variety of things. One thing could be an indication of whether the portable module is still valid or the time stamp may further enable the secure module to decide if the data is or is not counterfeit.

Assuming all the data passed to the secure module 108 is determined to be valid data, the secure module 108 subtracts the first value, the train fare, from the monetary value of the portable module 102 X7. The decrypted transaction count is then incremented.

A register within the secure module 108 is increased by the amount of the first value, the train fare, so that the secure module can keep an accounting of the amount of "money" it has collected X8. The secure module 108 creates a data packet, a second data, which comprises at least the portable module's serial number, the incremented transaction count, and the reduced monetary value of the portable module 102. The second data packet is then encrypted by the secure module 108 using a private key X9.

The microprocessor based device 104 receives the encrypted second data packet, passes the encrypted second data packet to the portable module 102 X10, and opens the turn style to let the module's user onto the train platform. The portable module 102 receives the encrypted second data packet and stores it in memory X11. The portable module also increments its transaction count indicating that another transaction has occurred X12.

Thus, the above description indicates how valuable information can be transferred between a portable insecure module 102 and a secure module 108 wherein there is a conservation of value. That is, no value is gained or lost. Value that was in the portable module 102 was decreased by the same amount value was added to the secure module 108. In the example provided, the decrease and increase in value was equal to a train fare. Such an increment or decrement can also be equal to an amount provided by an ATM, credit card transaction, cash acceptor, etc.

It is also understood that the insecure portable is module 102 could be another secure module similar to the secure module in the system, but programed to act like a portable module 102.

B. Transferring Units of Exchange Into the Portable Module 102

In this example, for simplicity, suppose the portable module does not have any monetary value and the user of the portable module wishes to "fill it up" with value. Suppose the user wishes to take cash out of an ATM machine and instead of pocketing the cash, the user wishes to put the cash value into the portable module 102.

Figure 5:
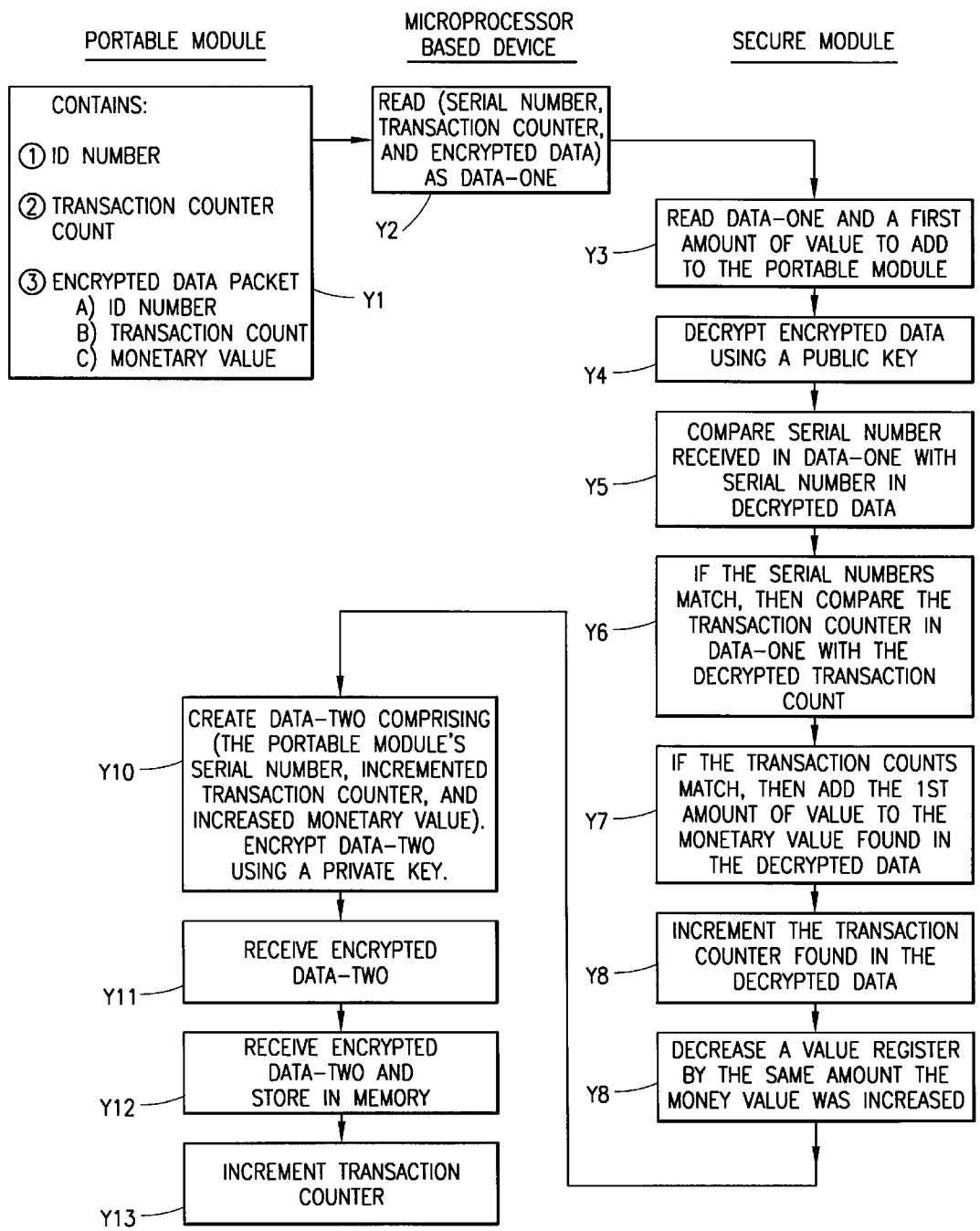
FIG. 5 is an exemplary technique for transferring valuable data securely out of a portable module.

Referring to FIG. 5, the portable module 102 contains its ID number, a transaction count and an encrypted data packet containing the portable module's ID number, transaction count and the monetary value of the portable module 102 Y1. The microprocessor based device 104, which in this example could be part of the ATM machine 112, receives the information contained in the portable module 102 when a communication is initiated between the portable module 102 and the microprocessor based device 104 Y2.

The microprocessor based device 104 passes the module's serial number, transaction count, and encrypted data packet as a first data packet to the secure module 108. The microprocessor based device also passes the amount of amount of monetary value to add to the portable module 102, as indicated by the ATM 112, to the secure module 108 Y3.

The secure module 108 decrypts the encrypted data passed to it using a public key Y4. The secure module 108 then makes a few comparisons to make sure that the data it has just received is valid and not counterfeit. The secure module 108 compares the serial number (ID number) received in the first data packet with the serial number (ID number) found in the decrypted data Y5. The secure module 108 also compares the transaction count passed the first data packet with the transaction count found in the decrypted data Y6. If the serial numbers and transaction counters match, then the secure module decides that the data received is valid and the secure module adds the monetary value, indicated by the ATM to the monetary value of the decrypted data Y7. The decrypted transaction count is incremented Y8. A register within the secure module may be decremented by the same amount that the monetary value of the decrypted data was increased Y8.

The secure module 108 creates a second data packet, that contains the portable module's ID number, the incremented transaction counter and the increased monetary value. The second data packet is then encrypted using a private key Y10.

The microprocessor based device 104 reads the encrypted second data packet and sends it to the portable module 102 Y11. The portable module receives the encrypted second data packet and stores it in memory Y12. The portable module also advances its transaction counter Y13. The result being that the portable module now has the value of the cash withdrawn from the ATM 112. Furthermore, a record of the transaction may have been recorded and kept in the secure module, as well as by the bank that operates the ATM 112.

Exemplary Firmware Definitions for Use With the Secure Module

Object The most primitive data structure accepted by and operated on by the secure modules firmware. A list of valid objects and their definitions is provided in the next section.

Group A self-contained collection of objects. An object's scope is restricted to the group of which it is a member.

Group ID A number preferably between 0 and 255 representing a specific group.

Object ID A number preferably between 0 and 255 representing a specific object within a specific group.

Object Type Preferably a 1-byte type specifier that describes a specific object.

PIN An alphanumeric Personal Identification number that is preferably eight bytes in length.

Common PIN The PIN that controls access to shared resources such as the audit trail. It is also used to control the host's ability to create and delete groups.

Group PIN The PIN that controls access to operations specific to objects within a group.

Audit Trail A record of transactions occurring after the secure module has been locked.

Locked Object An object which has been locked by executing the lock object command. Once an object is locked it is not directly readable.

Private Object An object which has been privatized by executing the privatize object command. Once an object is private, it is not directly readable or writable.

Locked Group A group which has been locked using the locked group command. After a group has been locked it will not allow object creation.

Composite Object A combination of several objects. The individual objects inherit the attributes of the composite object.

Exemplary Object Definitions

RSA Modulus A large integer preferably of at most 1024 bits in length. It is the product of 2 large prime numbers that are each about half the number of bits in length of the desired modulus size. The RSA modulus is used in the following equations for encrypting and decrypting a message M:

$$\text{Encryption: } C = M^e \pmod{N} \quad (1)$$

$$\text{Decryption: } M = C^d \pmod{N} \quad (2)$$

where C is the cyphertext, d and e are the RSA exponents (see below), and N is the RSA modulus.

RSA Exponent Both e and d (shown in equations 1 and 2 above) are RSA exponents. They are typically large numbers but are smaller than the modulus (N). RSA exponents can be either private or public. When RSA exponents are created in the secure module, they may be declared as either. Once created an exponent may be changed from a public exponent to a private exponent. After an exponent has been made private, however, it will remain private until the transaction group 40 to which it belongs is destroyed.

Transaction Script A transaction script is a series of instructions to be carried out by the secure module. When invoked the secure module firmware interprets the instructions in the script and places the results in the output data object (see below). The actual script is simply a list of objects. The order in which the objects are listed specifies the operations to be performed on the objects. transaction scripts 44 preferably may be as long as 128 bytes.

Transaction Counter The transaction counter object is preferably 4 bytes in length and is usually initialized to zero when it is created. Every time a transaction script, which references this object, is invoked, the transaction counter increments by 1. Once a transaction counter has been locked it is read only and provides an irreversible counter.

Money Register The money register object is preferably 4 bytes in length and may be used to represent money or some other form of credit. Once this object has been created, it must be locked to prevent a user from tampering with its value. Once locked the value of this object can be altered only by invoking a transaction script. A typical transaction group 40 which performs monetary transactions might have one script for withdrawals from the money register and one for deposits to the money register.

Clock Offset This object is preferably a 4 byte number which contains the difference between the reading of the secure module's real-time clock and some convenient time (e.g., 12:00 a.m., Jan. 1, 1970). The true time can then be obtained from the secure module by adding the value of the clock offset to the real-time clock.

SALT A SALT object is preferably 20 bytes in length and should be initialized with random data when it is created. When a host transmits a generate random SALT command, the secure module combines the previous SALT with the secure module's random number (produced preferably by randomly occurring power-ups) to generate a new random SALT. If the SALT object has not been privatized it may subsequently be read by issuing a read object command.

Configuration Data This is a user defined structure with preferably a maximum length of 128 bytes. This object is typically used to store configuration information specific to its transaction group 40. For example, the configuration data object may be used to specify the format of the money register object (i.e., the type of currency it represents). Since this object has no pre-defined structure, it may never be used by a transaction object.

Input Data An input data object is simply an input buffer with preferably a maximum length of 128 bytes. A transaction group may have multiple input objects. The host uses input data objects to store data to be processed by transaction scripts 44.

Output Data The output data object is used by transaction scripts as an output buffer. This object is automatically created when the transaction group is created. It is preferably 512 bytes in length and inherits password protection from its group.

Random Fill When the script interpreter encounters this type of object it automatically pads the current message so that its length is 1 bit smaller than the length of the preceding modulus. A handle to this object is automatically created when the transaction group is created. It is a private object and may not be read using the read object command.

Working Register This object is used by the script interpreter as working space and may be used in a transaction script. A handle to this object is automatically created when the transaction group is created. It is a private object and may not be read using the read object command.

ROM Data This object is automatically created when the transaction group is created. It is a locked object and may not be altered using the write object command. This object is 8 bytes and length and its contents are identical to the 8 by ROM data of the Micro-In-A-Can™.

Preferred Secure Module Firmware Command Set

---
Set Common PIN(01H)
---

Transmit (to secure module)
    01H, old PIN, new PIN, PIN option byte
Receive data
    CSB (command status byte) = 0 if successful,
appropriate error code otherwise
    Output length = 0
    Output Data = 0

---

Notes:

The PIN option byte may be the bitwise-or of any of the following values:

| | |
|---|---|
| PIN_TO_ERASE | 00000001b (require PIN for Master Erase) |
| PIN_TO_CREATE | 00000010b (require PIN for group creation). |

Initially the secure module has a PIN (Personal Identification Number) of 0 (Null) and an option byte of 0. Once a PIN has been established it can only be changed by providing the old PIN or by a Master Erase. However, if the PIN_TO_ERASE bit is set in the option byte, the PIN can only be changed through the set common PIN command.

Possible error codes for the set common PIN command:

| | |
|---|---|
| ERR_BAD_COMMON_PIN | (Common PIN match failed) |
| ERR_BAD_PIN_LENGTH | (New PIN length > 8 bytes) |
| ERR_BAD_OPTION_BYTE | (Unrecognizable option byte) |

For all commands described in this section, data received by the host will be in the form of a return packet. A return packet has the following structure:

| | |
|---|---|
| Command status byte | (0 if command successful, error code otherwise, 1 byte) |
| Output data length | (Command output length, 2 bytes) |
| Output data | (Command output, length specified above). |

---
Master Erase (02H)
---

Transmit data
    02H, Common PIN

---
Master Erase (02H)
---

Receive data
    CSB = 0 if command was successful,
ERR_BAD_COMMON_PIN otherwise
    Output length = 0
    Output data = 0

---

Notes:

If the LSB (least significant bit) of the PIN option is clear (i.e. PIN not required for Master Erase) then a 0 is transmitted for the Common PIN value. In general this text will always assume a PIN is required. If no PIN has been established a 0 should be transmitted as the PIN. This is true of the common PIN and group PINS (see below). If the PIN was correct the firmware deletes all groups (see below) and all objects within the groups. The common PIN and common PIN option byte are both reset to zero.

After everything has been erased the secure module transmits the return packet. The CSB is as described above. The output data length and output data fields are both set to 0.

---
Create Group (03H)
---

Transmit data
    03H, Common PIN, Group name, Group PIN
Receive data
    CSB = 0 if command successful, appropriate error code otherwise
    Output length = 1 if successful, 0 otherwise
    Output data = Group ID if successful, 0 otherwise

---

Notes:

The maximum group name length is 16 bytes and the maximum PIN length is eight bytes. If the PIN_TO_CREATE bit is set in the common PIN option byte and the PIN transmitted does not match the common PIN the secure module will set the OSC to ERR_BAD_COMMON_PIN.

Possible error return codes for the create group command:

| | |
|---|---|
| ERR_BAD_COMMON_PIN | (Incorrect common PIN) |
| ERR_BAD_NAME_LENGTH | (If group name length > 16 bytes) |
| ERR BAD_PIN_LENGTH | (If group PIN length > 8 bytes) |
| ERR_MIAC_LOCKED | (The secure module has been locked) |
| ERR_INSUFFICIENT_RAM | (Not enough memory for new group) |

---
Set Group PIN (04H)
---

Transmit data
    04H, Group ID, old GPIN, new GPIN
Receive data
    CSB = 0 if command successful, appropriate error code otherwise
    Output length = 0
    Output data = 0

---

Notes:

The Group PIN only restricts access to objects within the group specified by the group ID transmitted in the command packet.

Possible error codes for the set group PIN command:

| | |
|---|---|
| ERR_BAD_GROUP_PIN | (Group PIN match failed) |
| ERR_BAD_PIN_LENGTH | (New group PIN length > 8 bytes) |

| Create Object (05H) |
|---|
| Transmit data<br>    05H, Group ID, Group PIN, Object type, Object attributes, Object data<br>Receive data<br>    CSB = 0 if command successful, appropriate error code otherwise<br>    Output length = 1 if successful, 0 otherwise<br>    Output data = object ID if successful, 0 otherwise |

Notes:

If the Create Object command is successful the secure module firmware returns the object's ID within the group specified by the Group ID. If the PIN supplied by the host was incorrect or the group has been locked by the Lock Group command (described below) the secure module returns an error code in the CSB. An object creation will also fail if the object is invalid for any reason. For example, if the object being created is an RSA modulus (type 0) and it is greater than 1024 bits in length. transaction script creation will succeed if it obeys all transaction scripts rules.

Possible error return codes for the create object command:

| | | |
|---|---|---|
| ERR_BAD_GROUP_PIN | (Incorrect group PIN) | |
| ERR_GROUP_LOCKED | (The group has been locked) | |
| ERR_MIAC_LOCKED | (The secure module has been locked) | |
| ERR_INVALID_TYPE | (The object type specified is invalid) | |
| ERR_BAD_SIZE | (The objects length was invalid) | |
| ERR_INSUFFICIENT_RAM | (Not enough memory for new object) | |
| Object types: | RSA modulus | 0 |
| | RSA exponent | 1 |
| | Money register | 2 |
| | Transaction counter | 3 |
| | Transaction script | 4 |
| | Clock offset | 5 |
| | Random SALT | 6 |
| | Configuration object | 7 |
| | Input data object | 8 |
| | Output data object | 9 |
| Object Attributes: | Locked | 00000001b |
| | Privatized | 00000010b |

Objects may also be locked and privatized after creation by using the Lock Object and Privatize Object commands described below.

| Lock Object (06H) |
|---|
| Transmit data<br>    06H, Group ID, Group PIN, Object ID<br>Receive data<br>    CSB = 0 if command successful, appropriate error code otherwise<br>    Output length = 0<br>    Output data = 0 |

Notes:

If the Group ID, Group PIN and Object ID are all correct, the secure module will lock the specified object. Locking an object is an irreversible operation.

Possible error return codes for the lock object command:

| | |
|---|---|
| ERR_BAD_GROUP_PIN | (Incorrect group PIN) |
| ERR_GROUP_LOCKED | (The group has already been locked) |
| ERR_MIAC_LOCKED | (The secure module has been locked) |
| ERR_BAD_GROUP_ID | (Specified group does not exist) |
| ERR_BAD_OBJECT_ID | (Specified object does not exist) |

| Privatize Object (07H) |
|---|
| Transmit data<br>    07H, Group ID, Group PIN, Object ID<br>Receive data<br>    CSB = 0 if successful, appropriate error code otherwise |

Notes:

If the Group ID, Group PIN and Object ID were valid the object will be privatized. Privatized objects share all the properties of locked objects but are not readable. Privatized objects are only modifiable through transaction scripts. Note that locking a privatized object is legal, but has no meaning since object privatization is a stronger operation than object locking. Privatizing an object is an irreversible operation.

Possible error return codes for the privatize object command:

| | |
|---|---|
| ERR_BAD_GROUP_PIN | (Incorrect group PIN) |
| ERR_GROUP_LOCKED | (The group has already been locked) |
| ERR_MIAC_LOCKED | (The secure module has been locked) |
| ERR_BAD_GROUP_ID | (Specified group does not exist) |
| ERR_BAD_OBJECT_ID | (Specified object does not exist) |

| Make Object Destructable (08H) |
|---|
| Transmit data<br>    08H, Group ID, Group PIN, Object ID<br>Receive data<br>    CSB = 0 if successful, appropriate error code otherwise |

Notes:

If the Group ID, Group PIN and Object ID were valid the object will be made destructable. If an object is destructable it becomes unusable by a transaction script after the groups destructor becomes active. If no destructor object exists within the transaction group the destructible object attribute bit has no affect. Making an object destructable is an irreversible operation.

Possible error return codes for the make object destructable command:

| | |
|---|---|
| ERR_BAD_GROUP_PIN | (Incorrect group PIN) |
| ERR_GROUP_LOCKED | (The group has already been locked) |
| ERR_MIAC_LOCKED | (The secure module has been locked) |
| ERR_BAD_GROUP_ID | (Specified group does not exist) |
| ERR_BAD_OBJECT_ID | (Specified object does not exist) |

Lock Secure module (09H)

Transmit data
    09H, Common PIN
Receive data
    CSB = 0 if successful, appropriate error code otherwise
    Output length = 2 if successful, 0 otherwise
    Output data = audit trail size if successful, 0 otherwise Notes:

If the host supplied Common PIN is correct and the secure module has not previously been locked, the command will succeed. When the secure module is locked it will not accept any new groups or objects. This implies that all groups are automatically locked. The RAM not used by the system or by groups will be used for an audit trail. There is no audit trail until the secure module has successfully been locked!

An audit trail record is six bytes long and has the following structure:

Group ID|Object ID|Date/Time stamp.

Once an audit trail has been established, a record of the form shown above will be stored in the first available size byte location every time a transaction script is executed. Note that since the secure module must be locked before the audit trail begins, neither the group ID nor any object ID is subject to change. This will always allow an application processing the audit trail to uniquely identify the transaction script that was executed. Once the audit trail has consumed all of its available memory, it will store new transaction records over the oldest transaction records.

Possible error codes for the lock secure module command:

| | |
|---|---|
| ERR_BAD_COMMON_PIN | (Supplied common PIN was incorrect) |
| ERR_MIAC_LOCKED | (Secure module was already locked) |

Lock Group (0AH)

Transmit data
    0AH, Group ID, Group PIN
Receive data
    CSB = 0 if command successful, appropriate error code otherwise
    Output length = 0
    Output data = 0

Notes:

If the group PIN provided is correct the secure module BIOS will not allow further object creation within the specified group. Since groups are completely self-contained entities they may be deleted by executing the Delete Group command (described below).

Possible error return codes for the lock group command:

| | |
|---|---|
| ERR_BAD_GROUP_PIN | (Incorrect group PIN) |
| ERR_GROUP_LOCKED | (The group has already been locked) |
| ERR_MIAC_LOCKED | (The secure module has been locked) |
| ERR_BAD_GROUP_ID | (Specified group does not exist) |

Invoke Transaction Script (0BH)

Transmit data
    0BH, Group ID, Group PIN, Object ID
Receive data
    CSB = 0 if command successful, appropriate error code otherwise
    Output length = 1 if successful, 0 otherwise
    Output data = estimated completion time Notes:

The time estimate returned by the secure module is in sixteenths of a second. If an error code was returned in the CSB, the time estimate will be 0.

Possible error return codes for the execution transaction script command:

| | |
|---|---|
| ERR_BAD_GROUP_PIN | (Incorrect group PIN) |
| ERR_BAD_GROUP_ID | (Specified group does not exist) |
| ERR_BAD_OBJECT_ID | (Script object did not exist in group) |

Read Object (0CH)

Transmit data
    0CH, Group ID, Group PIN, Object ID
Receive data
    CSB = 0 if command successful, appropriate error code otherwise
    Output length = object length if successful, 0 otherwise
    Output data = object data if successful, 0 otherwise Notes:

If the Group ID, Group PIN and Object ID were correct, the secure module checks the attribute byte of the specified object. If the object has not been privatized the secure module will transmit the object data to the host. If the Group PIN was invalid or the object has been privatized the secure module will return a 0 in the output length, and data fields of the return packet.

Possible error codes for the read object command:

| | |
|---|---|
| ERR_BAD_GROUP_PIN | (Incorrect group PIN) |
| ERR_BAD_GROUP_ID | (Specified group does not exist) |
| ERR_BAD_OBJECT_ID | (Object did not exist in group) |
| ERR_OBJECT_PRIVATIZED | (Object has been privatized) |

| Write Object (0DH) |
|---|
| Transmit data<br>    0DH, Group ID, Group PIN, Object ID, Object size, Object Data<br>Receive data<br>    CSB = 0 if successful, appropriate error code otherwise<br>        Output length = 0<br>        Output data = 0 |

Notes:
If the Group ID, Group PIN and Object ID were correct, the secure module checks the attribute byte of the specified object. If the object has not been locked or privatized the secure module will clear the objects previous size and data and replace it with the new object data. Note that the object type and attribute byte are not affected.

Possible error codes for the write object command:

| | |
|---|---|
| ERR_BAD_GROUP_PIN | (Incorrect group PIN) |
| ERR_BAD_GROUP_ID | (Specified group does not exist) |
| ERR_BAD_OBJECT ID | (Object did not exist in group) |
| ERR_BAD_OBJECT_SIZE | (Illegal object size specified) |
| ERR_OBJECT_LOCKED | (Object has been locked) |
| ERR_OBJECT_PRIVATIZED | (Object has been privatized) |

| Read Group Name (0EH) |
|---|
| Transmit data<br>    0EH, Group ID<br>Receive data<br>    CSB = 0<br>    Output Length = length of group name<br>    Output data = group name |

Notes:
The group name length is a maximum of 16 bytes. All byte values are legal in a group name.

| Delete Group (0FH) |
|---|
| Transmit data<br>    0FH, Group ID, Group PIN<br>Receive data<br>    CSB = 0 if successful, appropriate error code otherwise<br>        Output length = 0<br>        Output data = 0 |

Notes:
If the group PIN and group ID are correct the secure module will delete the specified group. Deleting a group causes the automatic destruction of all objects within the group. If the secure module has been locked the Delete Group command will fail.

Possible error codes for the delete group command:

| | |
|---|---|
| ERR_BAD_CROUP_PIN | (Incorrect group PIN) |
| ERR_BAD_GROUP_ID | (Specified group does not exist) |
| ERR_MIAC_LOCKED | (Secure module has been locked) |

| Get Command Status Info (10H) |
|---|
| Transmit data<br>    10H<br>Receive data<br>    CSB = 0<br>    Output length = 6<br>    Output data = secure module status structure (see below) |

Notes:
This operation requires no PIN and never fails. The status structure is defined as follows:

| | |
|---|---|
| Last command executed | (1 byte) |
| Last command status | (1 byte) |
| Time command received | (4 bytes) |

| Get Secure module Configuration Info (11H) |
|---|
| Transmit data<br>    11H<br>Receive data<br>    CSB = 0<br>    Output length = 4<br>    Output data = secure module configuration structure |

Notes:
This operation requires no PIN and never fails. The configuration structure is defined as follows:

| | |
|---|---|
| Number of groups | (1 byte) |
| Flag byte (see below) | (1 byte) |
| Audit trail size/Free RAM | (2 bytes) |

The flag byte is the bitwise-or of any of the following values:

| |
|---|
| 00000001b (Secure module is locked) |
| 00000010b (Common PIN required for access) |

| Read Audit Trail Info (12H) |
|---|
| Transmit data<br>    12H, Common PIN<br>Receive data<br>    CSB = 0 if command successful, appropriate error code otherwise<br>    Output length = audit trail structure size (5) if successful, 0 otherwise |

Read Audit Trail Info (12H)

Output data = audit trail info structure if successful, 0 otherwise

Notes:

If the transmitted Common PIN is valid and the secure module has been locked, it returns audit trail configuration information as follows:

| | |
|---|---|
| Number of used transaction records | (2 bytes) |
| Number of free transaction records | (2 bytes) |
| A boolean specifying whether or not the audit trail rolled since previous read command | (1 byte) |

Possible error codes for the read audit trail info command:

| | |
|---|---|
| ERR_BAD_COMMON_PIN | (Common PIN was incorrect) |
| ERR_MIAC_NOT_LOCKED | (Secure module is not locked) |

Read Audit Trail (13H)

Transmit data
    13H, Common PIN
Receive data
    CSB = 0 if command successful, appropriate error code otherwise
    Output length = # of new records * 6 if successful, 0 otherwise
    Output data = new audit trail records Notes:

If the transmitted common PIN is valid and the secure module has been locked, it will transfer all new transaction records to the host.

Possible error codes for the read audit trail command:

| | |
|---|---|
| ERR_BAD_COMMON_PIN | (Common PIN was incorrect). |
| ERR_MIAC_NOT_LOCKED | secure module is not locked |

Read Group Audit Trail (14H)

Transmit data
    14H, Group ID, Group PIN
Receive data
    CSB = 0 if command successful, appropriate error code otherwise
    Output length = # or records for group * 6 if successful, 0 otherwise
    Output data = audit trail records for group Notes:

This command is identical to the read audit trail command, except that only records involving the group ID specified in the transmit data are returned to the host. This allows transaction groups to record track their own activities without seeing other groups records.

Possible error codes for the read group audit trail command:

| | |
|---|---|
| ERR_BAD_GROUP_ID | (Group ID does not exist) |
| ERR_PAD_GROUP_PIN | (Common PIN was incorrect) |
| ERR MIAC_NOT_LOCKED | (The secure module is not locked) |

Read Real Time Clock (15H)

Transmit data
    15H, Common PIN
Receive data
    CSB = 0 if the common PIN matches and ERR_BAD_COMMON_PIN otherwise
    Output length = 4
    Output data = 4 most significant bytes of the real time clock Notes:

This value is not adjusted with a clock offset. This command is normally used by a service provider to compute a clock offset during transaction group creation.

Read Real Time Clock Adjusted (16H)

Transmit data
    16H, Group ID, Group PIN, ID of offset object
Receive data
    CSB = 0 if successful, appropriate error code otherwise
    Output length = 4 if successful, 0 otherwise
    Output data = Real time clock + clock offset ID Notes:

This command succeeds if the group ID and group PIN are valid, and the object ID is the ID of a clock offset. The secure module adds the clock offset to the current value of the 4 most significant bytes of the RTC and returns that value in the output data field. Note that a transaction script may be written to perform the same task and put the result in the output data object.

Possible error codes for the real time clock adjusted command:

| | |
|---|---|
| ERR_BAD_GROUP_PIN | (Incorrect group PIN) |
| ERR_BAD_GROUP_ID | (Specified group does not exist) |
| ERR_BAD OBJECT_TYPE | (Object ID is not a clock offset) |

Get Random Data (17H)

Transmit data
    17H, Length (L)
Receive data
    CSB = 0 if successful, appropriate error code otherwise
    Output length = L if successful, 0 otherwise
    Output data = L bytes of random data if successful Notes:

This command provides a good source of cryptographically useful random numbers.

Possible error codes for the get random data command are:

| ERR_BAD_SIZE | (Requested number of bytes > 128) |

| Get Firmware Version ID (18H) |
|---|
| Transmit data<br>    18H<br>Receive data<br>    CSB = 0<br>    Output length = Length of firmware version ID string<br>    Output data = Firmware version ID string |

Notes:

This command returns the firmware version ID as a Pascal type string (length+data).

| Get Free RAM (19H) |
|---|
| Transmit data<br>    19H<br>Receive data<br>    CSB = 0<br>    Output length = 2<br>    Output data = 2 byte value containing the amount of free RAM |

Notes:

If the secure module has been locked the output data bytes will both be 0 indicating that all memory not used by transaction groups has been reserved for the audit trail.

| Change Group Name (1AH) |
|---|
| Transmit data<br>    1AH, Group ID, Group PIN, New Group name<br>Receive data<br>    CSB = 0 if successful or an appropriate error code otherwise<br>    Output length = 0<br>    Output data = 0 |

Notes:

If the group ID specified exists in the secure module and the PIN supplied is correct, the transaction group name is replaced by the new group name supplied by the host. If a group ID of 0 is supplied the PIN transmitted must be the common PIN. If it is correct, the secure module name is replaced by the new name supplied by the host.

Possible error codes for the change group name command:

| ERR_BAD_GROUP_PIN | (Incorrect group PIN) |
| ERR_BAD_GRQUP_ID | (Specified group does not exist) |
| ERR_BAD NAME_LENGTH | (New group name > 16 bytes) |

ERROR CODE DEFINITIONS

ERR_BAD_COMMAND (80H)

This error code occurs when the secure module firmware does not recognize the command just transmitted by the host.

ERR_BAD_COMMON_PIN (81H)

This error code will be returned when a command requires a common PIN and the PIN supplied does not match the secure module's common PIN. Initially the common PIN is set to 0.

ERR_BAD_GROUP_PIN (82H)

Transaction groups may have their own PIN, FIG. 6. If this PIN has been set (by a set group PIN command) it must be supplied to access any of the objects within the group. If the Group PIN supplied does not match the actual group PIN, the secure module will return the ERR_BAD_GROUP_PIN error code.

ERR_BAD_PIN_LENGTH (83H)

There are 2 commands which can change PIN values. The set group PIN and the set common PIN commands. Both of these require the new PIN as well as the old PIN. The ERR_BAD_PIN_LENGTH error code will be returned if the old PIN supplied was correct, but the new PIN was greater than 8 characters in length.

ERR_BAD_OPTION_BYTE (84H)

The option byte only applies to the common PIN. When the set common PIN command is executed the last byte the host supplies is the option byte (described in command section). If this byte is unrecognizable to the secure module, it will return the ERR_BAD_OPTION_BYTE error code.

ERR_BAD_NAME_LENGTH (85H)

When the create transaction group command is executed, one of the data structures supplied by the host is the group's name. The group name may not exceed 16 characters in length. If the name supplied is longer than 16 characters, the ERR_BAD_NAME_LENGTH error code is returned.

ERR_INSUFFICIENT_RAM (86H)

The create transaction group and create object commands return this error code when there is not enough heap available in the secure module.

ERR_MIAC_LOCKED (87H)

When the secure module has been locked, no groups or objects can be created or destroyed. Any attempts to create or delete objects will generate an ERR_MIAC_LOCKED error code.

ERR_MIAC_NOT_LOCKED (88H)

If the secure module has not been locked there is no audit trail. If one of the audit trail commands is executed this error code will be returned.

ERR_GROUP_LOCKED (89H)

Once a transaction group has been locked object creation within that group is not possible. Also the objects attributes and types are frozen. Any attempt to create objects or modify their attribute or type bytes will generate an ERR_GROUP_LOCKED error code.

ERR_BAD_OBJECT_TYPE (8AH)

When the host sends a create object command to the secure module, one of the parameters it supplies is an object type (see command section). If the object type is not recognized by the firmware it will return an ERR_BAD_OBJECT_TYPE error code.

ERR_BAD_OBJECT_ATTR (8BH)

When the host sends a create object command to the secure module, one of the parameters it supplies is an object attribute byte (see command section). If the object attribute byte is not recognized by the firmware it will return an ERR_BAD_OBJECT_ATTR error code.

ERR_BAD_SIZE (8CH)

An ERR_BAD_SIZE error code is normally generated when creating or writing an object. It will only occur when the object data supplied by the host has an invalid length.

ERR_BAD_GROUP_ID (8DH)

All commands that operate at the transaction group level require the group ID to be supplied in the command packet. If the group ID specified does not exist in the secure module it will generate an ERR_BAD_GROUP_ID error code.

ERR_BAD_OBJECT_ID (8EH)

All commands that operate at the object level require the object ID to be supplied in the command packet. If the object ID specified does not exist within the specific transaction group (also specified in the command packet) the secure module will generate an ERR_BAD_OBJECT_ID error code.

ERR_INSUFFICIENT_FUNDS (8FH)

If a script object that executes financial transactions is invoked and the value of the money register is less than the withdrawal amount requested an ERR_INSUFFICIENT_FUNDS error code will be returned.

ERR_OBJECT_LOCKED (90H)

Locked objects are read only. If a write object command is attempted and it specifies the object ID of a locked object the secure module will return an ERR_OBJECT_LOCKED error code.

ERR_OBJECT_PRIVATE (91H)

Private objects are not directly readable or writable. If a read object command or a write object command is attempted, and it specifies the object ID of a private object, the secure module will return an ERR_OBJECT_PRIVATE error code.

ERR_OBJECT_DESTRUCTED (92H)

If an object is destructible and the transaction group's destructor is active the object may not be used by a script. If a script is invoked which uses an object which has been destructed, an ERR_OBJECT_DESTRUCTED error code will be returned by the secure module.

The exemplary embodiment of the present invention is preferably placed within a durable stainless steel, token-like can. It is understood that an exemplary secure module can be placed in virtually any articulatable item. Examples of articulatable items include credit cards, rings, watches, wallets, purses, necklaces, jewelry, ID badges, pens, clipboards, etc.

The secure module 108 preferably is a single chip "trusted computer". By the word "trusted" it is meant that the computer is extremely secure from tampering by unwarranted means. The secure module incorporates a numeric coprocessor optimized for math intensive encryption. The BIOS is preferably immune to alteration and specifically designed for very secure transactions.

Each secure module can have a random "seed" generator with the ability to create a private/public key set. The private key never leaves the secure module and is only known by the secure module. Furthermore, discovery of the private key is prevented by active self-destruction upon wrongful entry into the secure module. The secure module can be bound to the user by a personal identification number (PIN).

When transactions are performed by the secure module 108 certificates of authentication are created by either or both the secure module and a system the secure module communicates with. The certificate can contain a variety of information. In particular, the certificate may contain:

1) who is the secure module user via a unique registration number and a certified public key.
2) when the transaction took place via a true-time stamping of the transaction.
3) where the transaction took place via a registered secure module interface site identification.
4) security information via uniquely serialized transactions and digital sign on message digests.
5) secure module status indicated as valid, lost, or expired.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for electronically transferring units of exchange between a first module and a second module, comprising the steps of:

a. initiating communication between said first module and an electronic device;
   b. passing a first value datum from said first module to said electronic device;
   c. passing said first value datum from said electronic device to said second module;
   d. performing a mathematical calculation on said first value datum thereby creating a second value datum;
   e. passing said second value datum from said second module to said electronic device;
   f. passing said second value datum from said electronic device to said first module;
   g. storing said second value datum in said first module; and
   h. discontinuing communication between said first module and said electronic device.

2. The method of claim 1, wherein said first value datum represents a monetary equivalent.

3. The method of claim 1, wherein said first value datum is encrypted.

4. The method of claim 1, wherein said second value datum is encrypted.

5. The method of claim 3, wherein the step of performing a mathematical calculation comprises the steps of:

m. decrypting said first value datum with a public key thereby creating a decrypted value;

n. performing at least one of an addition function and a subtraction function on said decrypted value thereby creating a value result; and o. encrypting said value result with a private key thereby creating said second value datum.

6. The method of claim 1, wherein the step (b) of passing is performed over at least a single conductive contact.

* * * * *

UNITED STATES PATENT AND TRADEMARK OFFICE
CERTIFICATE OF CORRECTION

PATENT NO. : 5,949,880
DATED : Sep. 7, 1999
INVENTOR(S) : Curry et al.

It is certified that error appears in the above-identified patent and that said Letters Patent is hereby corrected as shown below:

| | |
|---|---|
| Column 2, line 57 | Replace "electromagnetic" With --electro-magnetic-- |
| Column 5, line 15 | Before "information" Remove --is-- |
| Column 8, line 26 | Before "module" Remove --is-- |
| Column 12, line 47 | Replace "ERR_BAD_PIN_LENGTH" With --ERR_BAD_PIN_LENGTH-- |
| Column 17, line 34 | Replace "ERR_BAD_OBJECT_ID" With --ERR_BAD_OBJECT_ID-- |

UNITED STATES PATENT AND TRADEMARK OFFICE
CERTIFICATE OF CORRECTION

PATENT NO. : 5,949,880
DATED : Sept 7, 1999
INVENTOR(S) : Curry et al

It is certified that error appears in the above-identified patent and that said Letters Patent is hereby corrected as shown below:

Column 20, line 6        Replace "ERR_MIAC_NOT_LOCKED"
                         With --ERR_MIAC_NOT_LOCKED--

Column 20, line 48       Replace "ERR_BAD_OBJECT_TYPE"
                         With --ERR_BAD_OBJECT_TYPE--

Column 21, line 58       Replace "ERR_BAD_NAME_LENGTH"
                         With --ERR_BAD_NAME_LENGTH--

Signed and Sealed this

Twenty-fifth Day of April, 2000

Attest:

Attesting Officer

Q. TODD DICKINSON

Director of Patents and Trademarks